United States Patent [19]

Jacobson

[11] 4,324,268

[45] Apr. 13, 1982

[54] AUTOMATIC FLOOD CONTROL VALVE

[76] Inventor: Avram A. Jacobson, 100 Sheffield Pl., San Antonio, Tex. 78213

[21] Appl. No.: 69,264

[22] Filed: Aug. 24, 1979

[51] Int. Cl.³ ...................... H01H 35/00; G08B 21/00
[52] U.S. Cl. .................................. 137/312; 307/118; 340/620; 361/178
[58] Field of Search ........................ 137/312; 361/178; 73/304 R, 304 C; 137/392; 307/118; 340/620; 417/297.5

[56] References Cited

U.S. PATENT DOCUMENTS

| | | | |
|---|---|---|---|
| 2,924,234 | 2/1960 | Wilson | 361/178 |
| 3,016,525 | 1/1962 | Hauck | 361/178 |
| 3,443,163 | 5/1969 | Beller et al. | 361/178 |
| 3,473,553 | 10/1969 | Collins | 137/312 |
| 3,500,844 | 3/1970 | Sonner | 137/78.3 |
| 3,582,717 | 1/1971 | Perlaky | 361/178 |
| 3,770,002 | 11/1973 | Brown | 137/312 |
| 3,796,925 | 8/1972 | Breeding | 361/178 |
| 3,823,874 | 7/1974 | Kroeck | 239/65 |
| 3,874,403 | 4/1975 | Fischer | 137/386 |
| 4,126,857 | 11/1978 | Lancia et al. | 340/620 |
| 4,210,177 | 7/1980 | Moore et al. | 137/613 |

Primary Examiner—A. Michael Chambers
Attorney, Agent, or Firm—Arnold, White & Durkee

[57] ABSTRACT

An automatic flood control valve apparatus having a normally open valve, in combination with a latching relay for closing the valve, which latches the valve in a closed position when the relay is energized and until it is manually reset, and a single transistor sensor circuit for energizing the relay in response to a flood. A power supply circuit is also disclosed.

9 Claims, 5 Drawing Figures

AUTOMATIC FLOOD CONTROL VALVE

BACKGROUND OF THE INVENTION

This invention relates generally to a novel flood control apparatus for sensing a flood and for discontinuing the flow of fluid to an appliance or an entire household in response to a flood. More particularly, this invention concerns an automatic flood control valve adapted to shut off the flow of water to a water heater, washer or other appliance in the event of a flood resulting from the malfunctioning of such an appliance.

In the past, it has been common to employ a sensor capacitor in connection with a relaxation oscillator to actuate a solenoid shutoff valve. Such prior art arrangements require relatively complicated adjustments of the sensitivity of the oscillator in order to provide appropriate sensitivity without false alarms. Such arrangements depend upon the leakage resistance of the capacitor to change the operating state of the relaxation oscillator.

The operation of such prior art devices is affected by water condensation that may occur in the environments encountered in many appliance installations. Such condensation may affect the leakage resistance of the sensor capacitor. Moreover, the construction of the sensor capacitor may be critical; and suitable sensor capacitors are not readily available. Many prior art sensor capacitors require wick arrangements to induce wetting of the sensor.

Prior art relaxation oscillator devices are expensive to operate because they require electrical current during normal operation. The valve is held in an open position by energizing a solenoid valve coil. Thus, the energy requirements for such prior art devices renders them unsatisfactory and impractical. An example of such a device is disclosed in U.S. Pat. No. 3,770,002, dated Nov. 6, 1973, issued to Lawrence C. Brown.

Other prior art devices have employed open topped water collecting trays placed beneath an appliance. An example of such a prior art device is disclosed in U.S. Pat. No. 3,473,553, to Thomas H. Collins, issued Oct. 21, 1969.

Collins utilizes a float-actuated electrical switch to close an electrical circuit when sufficient water collects in the tray. A plunger is depressed to open a normally closed valve; and a latch pin is used to hold the valve in the open position. The pin is retracted by means of a solenoid, thus permitting the valve to be closed by a spring.

Such devices are unsatisfactory because a significant amount of water must leak from the appliance before the float will activate the switch. Moreover, such devices have the disadvantage of utilizing movable parts for the water detection apparatus. It will be appreciated that such float mechanisms may become rusted or may stick, and consequently not move in response to water in the collecting tray. If the float does not move, then the device will not operate to shut off the flow of water.

A further disadvantage of the Collins device is the relatively slow reaction time of the device. The device will not operate to close the value until enough water has filled the collecting tray to move the float. A small leak may take a relativey long time to fill the collecting tray.

It will be appreciated that the Collins device is ineffective when the leak is so situated that water does not fall into the tray. Moreover, the valve must be placed immediately adjacent to the appliance in the Collins device.

Other prior art devices, such as the device disclosed in U.S. Pat. No. 3,874,403, dated Apr. 1, 1975, issued to Wayne L. Fischer, have employed fluid sensitive switches to directly switch solenoids. Such prior art devices are unsatisfactory because a significant amount of current must pass through the fluid in order to actuate the solenoid. Special sensitive solenoids may be required to close conventional control valves, because the amount of current that may be passed directly through the water or fluid in series with the solenoids may be limited. The imperfect conductivity of water often presents a significant resistance in series with the solenoids. A significant voltage drop may occur across the water.

A device for controlling lawn sprinklers is disclosed in U.S. Pat. No. 3,823,874, to Herbert Kroeck, issued July 16, 1974. The Kroeck device draws a significant amount of current during normal operation to energize a solenoid in order to hold a normally closed control valve open. Kroeck discloses a trough adapted to collect water from the sprinkler and to shut off the valve when the water reaches a predetermined level. The Kroeck device requires two transistors for its operation.

Another prior art device for controlling lawn sprinkling systems is disclosed in U.S. Pat. No. 3,500,844, issued Mar. 17, 1970, to George E. Sanner. This device has a rain switch with a fast reaction time. The Sanner device is adapted to shut off the flow of water to a sprinkler system when the rain switch becomes wet from rain water. Only a small amount of moisture collects on the rain switch base. The large area of the rain switch is adapted to facilitate the rapid evaporation of water from the rain switch. The Sanner device is designed to resume the flow of water to the sprinkler system substantially coterminously with the cessation of rain. Thus, the Sanner device would be impractical for use as a flood control apparatus. The timer in the Sanner device is also not adapted for flood control applications.

The above prior art devices are unsatisfactory in that they require the continued presence of water in order to maintain the valve in the shutoff position. If a flood occurred and the device operated to shut off the valve, the valve would reopen when the water evaporated and thus once again permit fluid to flow into a damaged or leaking appliance. If a home owner were away on a trip or vacation, a damaged appliance might not be detected for an extended period of time. Thus, the prior art devices could allow the area of the appliance to be repeatedly flooded over a period of several days until someone returned and discovered the damaged appliance. Moreover, the energy requirements of prior art devices which require electrical current to maintain a valve in an open position during normal operation can represent a significant expense in the operation of such devices.

A probe-type liquid detector is disclosed in U.S. Pat. No. 4,126,857, issued to Frederick N. Lancie, dated Nov. 21, 1978. The Lancia device is adapted to set off an audible alarm upon detection of water. However, the Lancia device is unsatisfactory because it requires human intervention to prevent flooding from the damaged appliance. If no one is present in the nearby vicinity when the flood occurs, the Lancia device would be ineffective to prevent flooding and consequential damage to the area.

A "Flood Guard" device is offered for sale by Symtec, Inc., Farmington, Mich. This device produces an 1800 Hz buzzer sound when a flood condition is detected. The device is battery operated, and consequently requires that the batteries be replaced periodically. The batteries will also run down if the alarm sounds for more than a day. The "Flood Guard" is unsatisfactory because it is not fully automatic. It will not prevent flood damage without human intervention. It will be appreciated that significant damage can occur in the event of sudden flooding during the amount of reaction time that must normally elapse between the time that someone hears the alarm and the time that it takes someone to stop the flow of water. It will also be appreciated that significant damage can occur in the event that no one is present when the alarm sounds.

Other representative prior art patents are U.S. Pat. Nos. 3,200,388; 3,069,671; 2,043,857; and 1,786,843.

Many of the above prior art devices are unsatisfactory because they are not easily installed upon existing appliances; they have also been expensive and difficult to operate. Many prior art devices are bulky and difficult to install. Some prior art devices are not fully automatic and will not prevent flood damage.

While such prior art arrangements have exhibited a degree of utility in preventing damage due to flooding caused by a damaged or leaking appliance, room for significant improvement remains. The problems enumerated in the foregoing are not intended to be exhaustive, but rather are among many which tend to impair the effectiveness of previously known flood control devices. Other noteworthy problems may also exist; however, those presented above should be sufficient to demonstrate that prior flood control valves appearing in the art have not been altogether satisfactory.

SUMMARY OF A PREFERRED EMBODIMENT OF THE INVENTION

Recognizing the need for an improved automatic flood control valve, it is, therefore, a general feature of the present invention to provide a novel automatic flood control valve that is simpler, more compact, more reliable, less expensive to manufacture, and which minimizes or reduces the problems of the type previously noted.

It is a more particular feature of the present invention to provide a flood control valve that does not draw significant current during normal operation, but which only draws significant electrical current in the event of a flood. A connected feature resides in the provision of a normally open valve for controlling the flow of fluid to an appliance. Because the valve is normally open, it does not require electrical current to maintain it in the open position during normal operation of the appliance.

Yet another feature of the present invention resides in the latching relay. This feature holds the valve closed once a flood condition is detected, and as a result prevents the flow of water to the appliance even if the leak is not detected for a number of days. Thus, evaporation of water from the probe will not cause the valve to reopen. A correlated feature resides in the provision of a manually operated reset switch. Thus, the flood control valve must be manually reset before the flow of fluid resumes to the appliance.

A further feature of the present invention resides in the provision of an automatic flood control apparatus that does not require a great deal of current to be passed through water between the contacts of a probe in order to close the valve. A feature of the present invention involves the ability to actuate the solenoid that controls the valve without passing a large current through the water between the probe contacts.

A flood control valve according to the present invention includes the feature of having a fast reaction time. The present invention is completely automatic. The present invention includes the feature of having adequate sensitivity to detect flooding quickly and thus facilitate a quick reaction time.

Of independent significance is the feature of the present invention residing in its operability to control existing appliances without modification to the appliance. Moreover, the present invention includes the feature of permitting the attachment of the control valve to the main water inlet of a structure or dwelling. Multiple sites or appliances may be monitored by the present invention; and a single valve in accordance with the present invention may be used to control water flow to such sites or appliances. The present invention includes the feature of permitting multiple sensors connected in parallel to be used in connection with a single valve.

Yet another feature of the present invention resides in the provision of a remote testing circuit to enable convenient verification of the operation of the invention. The invention includes the feature of providing a remote audible alarm in the event of a flood in addition to automatically closing a control valve.

A general feature resides in the ability to construct an automatic flood control valve according to the present invention in a relatively small enclosure occupying a relatively insignificant amount of space. The present invention includes the feature of permitting operation of the flood control apparatus in connection with a wide variety of appliances.

Finally, a feature resides in the inexpensive construction and operation achieved by the present invention, inasmuch as only one transistor is required for the invention, and an insignificant amount of current is drawn by the invention during normal operation of the appliance.

An automatic flood control valve according to a presently preferred embodiment of the invention intended to substantially incorporate the foregoing features includes a normally open valve controlling the flow of fluid to an appliance in combination with a solenoid valve coil, a fluid probe, switching means, a resistor and a relay. The fluid probe has two terminals in separate relation to each other which permit the flow of electrical current through the probe in response to the presence of water. The resistor develops a switching signal in response to the current flowing through the probe and actuates switching means, thereby providing a fluid indication signal. The fluid indication signal closes the relay. The relay has two sets of contacts which are both normally opened. The first relay contact switch latches the relay and holds it closed. The second relay contact switch actuates the solenoid valve coil to close the valve.

An apparatus according to the present invention may also include a reset switch adapted to interrupt the flow of current through the relay, thus allowing the relay contacts to open. The reset switch is adapted to unlatch the relay, and is manually operated.

A second resistor may be included between the probe and the switching means and a capacitor may be connected across the terminals of the switching means where the flood indication signal appears.

A power supply is provided to supply electrical current to the circuit.

Additional features and advantages of the present invention will become apparent with reference to the following detailed description of a preferred embodiment thereof in connection with the accompanying drawings, wherein like reference numerals have been applied to like elements, in which:

DETAILED DESCRIPTION OF A PREFERRED EMBODIMENT OF THE INVENTION

Figure 1:
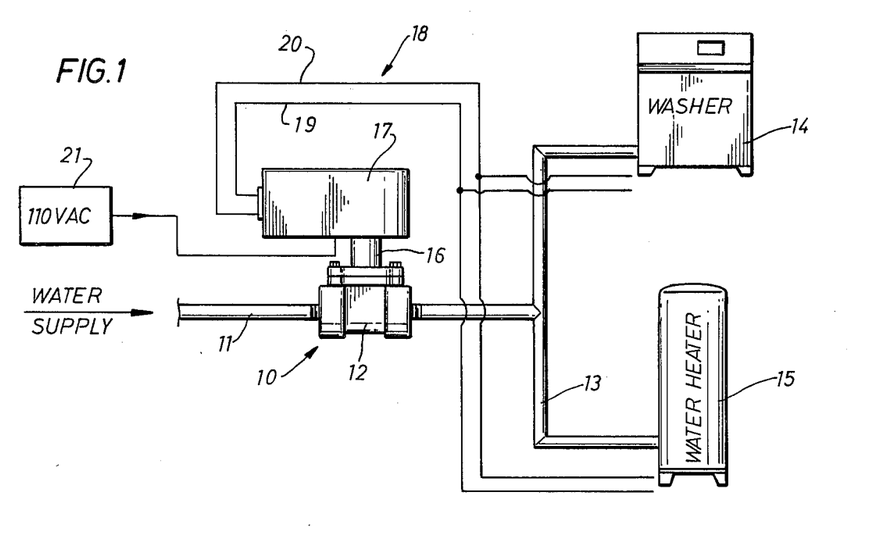
FIG. 1 depicts the automatic flood control valve in connection with a washer and a water heater.

Turning first to FIG. 1, an automatic flood control valve apparatus 10 is shown. A first conduit, pipe or tube 11 supplies water or other fluid through a normally open valve assembly 12 to a second conduit, pipe or tube 13. The second conduit 13 supplies water to a washer 14 and a water heater 15. It will be appreciated that any appliance that utilizes water may be substituted for the washer 14 or the water heater 15.

During normal operation of the appliances 14 and 15, the valve assembly 12 is open and water flows through the first conduit 11 and the second conduit 13 to the appliances 14 and 15.

The apparatus 10 includes a solenoid shaft 16. The solenoid shaft 16 is connected to a circuit enclosure 17.

A probe 18 is shown connected to the circuit enclosure 17. The probe 18 comprises a first probe conductor or wire 19 and a second probe conductor or wire 20. The first and second probe conductors 19 and 20 are placed in close separate relation to each other in an area immediately below or adjacent to the appliances 14 and 15. As will be explained more fully below, when water leaks from or floods near or underneath the appliances 14 or 15, the water will complete the electrical circuit between the first and second probe conductors 19 and 20, allowing current to flow between the first probe conductor 19 and the second probe conductor 20.

The first and second probe conductors 19 and 20 may have one or more extensions connected in parallel thereto in order to facilitate the use of a single flood control apparatus 10 in connection with two or more appliances 14 and 15, as shown in FIG. 1.

Power is supplied to the apparatus 10 from a conventional source of alternating current 21 (not shown).

Figure 2:
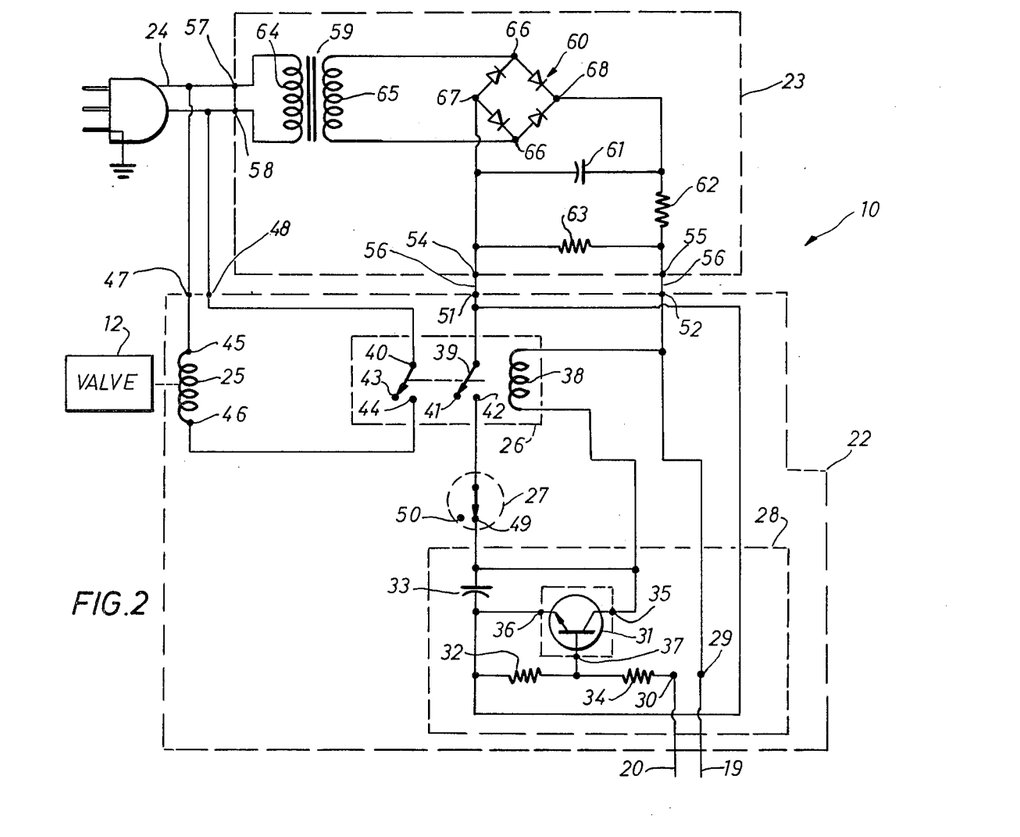
FIG. 2 is a schematic of the circuit employed in the flood control apparatus.

It is desirable to have a circuit in the circuit enclosure 17 that will respond to the presence of water between the first and second probe conductors 19 and 20, and which will operate to close the normally open valve assembly 12. Turning now to FIG. 2, this is essentially accomplished in the present instance by the automatic flood control apparatus 10. The apparatus 10 comprises a control circuit 22, a power supply 23, a valve assembly 12 and electrical means 24. Electrical means 24 is connected to a conventional source of alternating electrical current 21 (not shown).

In the illustrated embodiment, the control circuit 22 comprises a solenoid valve coil 25, a relay 26, a reset switch 27 and a sensor circuit 28.

The solenoid valve coil 25 is adapted to close the valve 12 when current is passed through the coil 25. Preferably, current does not pass through the coil 25 during normal operation and the valve 12 is normally opened.

The fluid probe 18 is connected to a first probe terminal 29 and a second probe terminal 30. In the illustrated embodiment, the first conductor 19 is connected to the first probe terminal 29; and the second conductor 20 is connected to the second probe terminal 30.

It is desirable that electrical current be permitted to flow through the relay 26 when water completes a circuit between the first probe conductor 19 and the second probe conductor 20. In the preferred construction, the sensor circuit 28 comprises a switching means 31, a first resistor 32, a first capacitor 33 and a second resistor 34. The switching means 31 has a load terminal 35, a common terminal 36 and a sensor terminal 37. In the present instance, current flowing through the first probe terminal 29 and the second probe terminal 30 will flow through the second resistor 34 and may flow through the first resistor 32. The first and second resistors 32 and 34 form a voltage divider, dividing the voltage that appears between the second probe sensor terminal 30 and the common terminal 36.

In the present instance, switching means 31 is a transistor having its emitter connected to the common terminal 36, its collector connected to the load terminal 35, and its base connected to the sensor terminal 37. Current flowing through the first resistor 32 generates a switching signal across the first resistor 32. Current flowing through the first resistor 32 will cause the transistor 31 to conduct. Current will flow between the sensor terminal 37 and the common terminal 36, thus causing current to flow between the load terminal 35 and the common terminal 36. Current flowing between the load terminal 35 and the common terminal 36 will generate a flood indication signal between the load terminal 35 and the common terminal 36. The flood indication signal generated by the sensor circuit 28 may be used to actuate or energize the relay 26.

In accordance with the invention, the relay 26 comprises a closing coil 38, a first contact switch 39, and a second contact switch 40. The first contact switch 39 has an open position 41 and a closed position 42. Similarly, the second contact switch 40 has an open position 43 and a closed position 44. When the closing coil 38 is not energized, the first and second contact switches 39 and 40 are normally in the open positions 41 and 43 respectively. When current flows through the closing coil 38, the first and second contact switches 39 and 40 are switched to the closed positions 42 and 44, respectively.

When water causes electrical current to flow between the first probe terminal 29 and the second probe terminal 30, the fluid indication signal generated by the switching means 31 will cause current to flow through the closing coil 38. The current flowing through the closing coil 38 will close the first and second contact switches 39 and 40.

The second contact switch 40 will enable current to flow through the solenoid valve coil 25. As shown in FIG. 2, the valve coil 25 has its first end 45 connected to a first input terminal 47. The valve coil 25 has its second end 46 connected to the closed position terminal 44 of the second contact switch 40. The second contact switch 40 is connected to a second input terminal 48.

In the preferred construction, electrical means 24 connects the first and second input terminals 47 and 48 to a source of electrical current 21. Thus, when the second contact switch 40 is moved to the closed position 44, current will flow through the valve coil 25 and close the valve 12.

When the first contact switch 39 is moved to the closed position 42, it completes a circuit that permits current to flow through the closing coil 38. Thus, in a preferred embodiment, the first contact switch 39 will latch the relay 26 in the closed positions 42 and 44, regardless of the continued presence of a flood indication signal between the load terminal 35 and the common terminal 36. If the water evaporates or is cleaned up and electrical current thus no longer flows between the first and second probe terminals 29 and 30, the relay 26 will continue to hold the valve 12 in the closed position.

It is desirable to provide manual means for unlatching the relay 26 to permit the opening of the valve 12. In a preferred embodiment, this is essentially accomplished by the reset switch 27. The reset switch 27 has a closed position 49 and an open position 50. The reset switch 27 is normally in the closed position 49. The reset switch 27 may be manually operated to switch it to the open position 50.

Thus, when the closing coil 38 is energized and the first contact switch 39 is in the closed position 42, the reset switch 27 may be moved to the open position 50 in order to stop the flow of current through the closing coil 38 and consequently unlatch the relay 26. Preferably, the first and second contacts 39 and 40 will be spring loaded so that they will automatically return to the normally open positions 41 and 43 when the current through the closing coil 38 is interrupted by the reset switch 27.

Normally, the water or other fluid between the fluid probes 19 and 20 will be removed prior to resetting the reset switch 27, or the plug 24 may be removed from the source of current 21.

The control circuit 22 has a first power supply terminal 51 and a second power supply terminal 52. The power supply 23 has a first power output terminal 54 and a second power output terminal 55. The control circuit 22 is connected to the power supply 23 by power supply connection means comprising wires or conductors 56. In the illustrated embodiment, the first power supply terminal 51 is connected to the first power output terminal 54 and the second power supply terminal 52 is connected to the second power output terminal 55.

The power supply 23 also has a third input terminal 57 and a fourth input terminal 58. The third and fourth input terminals 57 and 58 are connected by electrical means 24 to a source of alternating electrical current 21 (not shown).

In carrying out the invention, the power supply 23 may comprise a transformer 59, a bridge rectifier 60, a second capacitor 61, a third resistor 62, and a fourth resistor 63.

The transformer 59 has a primary winding 64 and a secondary winding 65. The primary winding 64 is connected between thwe third and fourth input terminals 57 and 58. The secondary winding 65 is connected to the bridge input terminals 66 of the bridge rectifier 60.

Preferably the bridge rectifier 60 is a full wave bridge rectifier. The bridge rectifier 60 has a first bridge output terminal 67 and a second bridge output terminal 68. The first bridge output terminal 67 is connected to the first power output terminal 54. The second bridge output terminal 68 is connected to one end of the third resistor 62. The other end of the third resistor 62 is connected to the second power output terminal 55.

The second capacitor 61 is connected between the first and second bridge output terminals 67 and 68. The fourth resistor 63 is connected between the first and second power supply terminals 54 and 55.

The third resistor 62, the second capacitor 61, and to some extent the fourth resistor 63, provide filteration of the pulsating direct current generated by the bridge rectifier 60. In a preferred embodiment, the fourth resistor 63 has a relatively high value and serves as a bleeder resistor to discharge the second capacitor 61 when the power supply 23 is not connected to a source of electrical current.

An embodiment of the present invention that may yield satisfactory results in practice includes:

| Component | Specification |
| --- | --- |
| Transformer 59 | 110 volt primary, 12.6 volt, 300 mA secondary. |
| Bridge Rectifier 60 | 1 amp., 50 volt, full wave silicon bridge rectifier |
| Relay 26 | 12 volts dc, DPDT, 170 ohm closing coil, P & B R50-E2-Y2 |
| Transistor 31 | NPN, Sylvania ECG172A |
| Solenoid valve 12 and valve coil 25 | normally open, 15.4 watts, 110 volt AC, 50–60 Hz valve coil, ⅜inch pipe, ⅜inch orifices, 125 pounds per square inch, general purpose, NEMA Type 1 Solenoid enclosure, Red-Hat Cat. No. 8210B35, Automatic Switch Co., Florham Park, N.J. |
| First Resistor 32 | 22,000 ohms. |
| Second Resistor 34 | 22,000 ohms. |
| First Capacitor 33 | 2.2 mfd. |
| Third Resistor 62 | 10 ohms. |
| Fourth Resistor 63 | 100,000 ohms. |
| Second Capacitor 61 | 50 mfd., 25 volts, electrolytic axial. |

Figure 3:
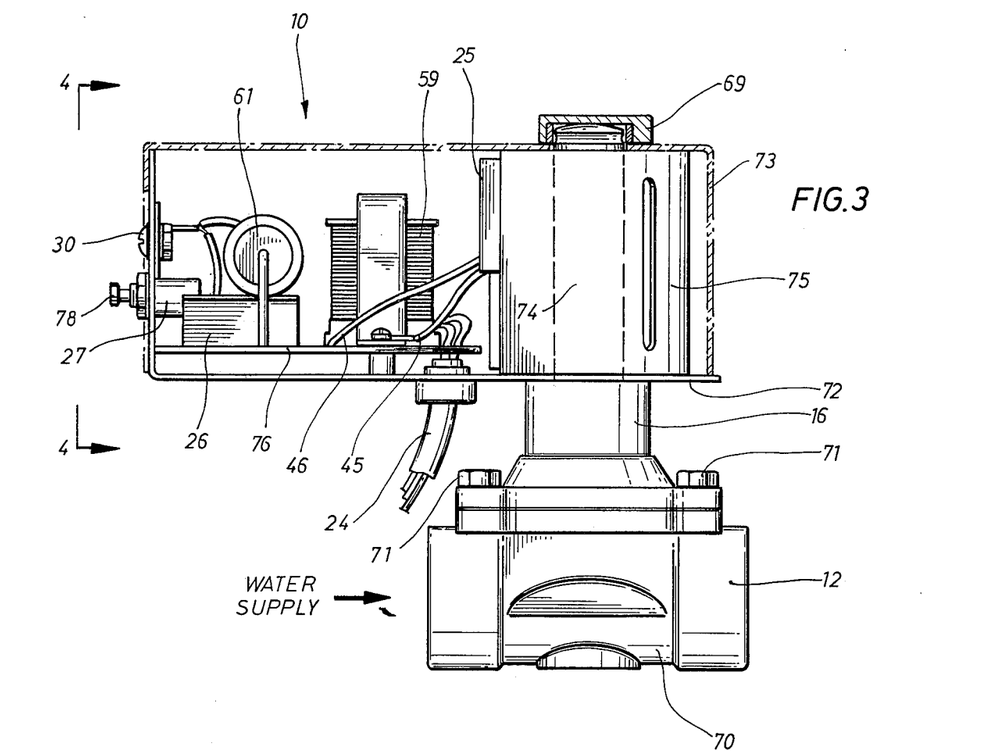
FIG. 3 shows a partially cutaway side view of the automatic flood control valve.

An embodiment of the present invention that has given satifactory results in practice is illustrated in FIG. 3. FIG. 3 shows a partially cutaway side view illustrating the automatic valve control apparatus 10.

The valve assembly 12 comprises a lower valve body 70 connected to the solenoid shaft casing 16 by fastening means or bolt means 71.

Figure 4:
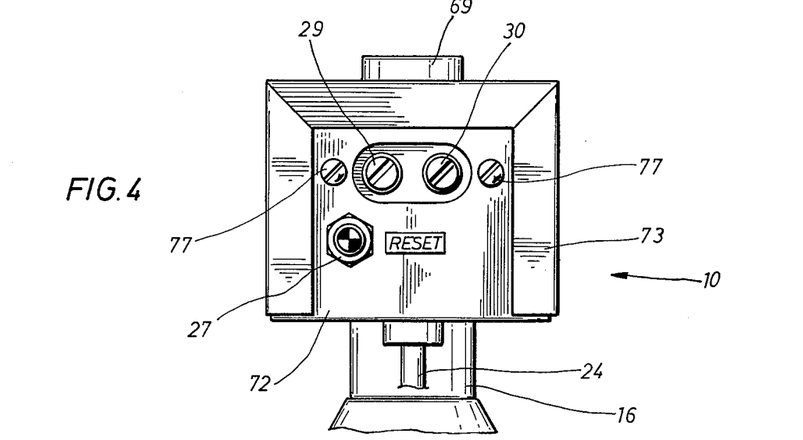
FIG. 4 is an elevation view of the automatic flood control valve depicted in FIG. 3.

The water supply enters through the conduit 11 (not shown) from the left, as shown in FIG. 4. The valve 12 is normally open, and thus permits the water to continue to flow to the right to appliances 14 and 15 (not shown).

In the illustrated embodiment, the valve assembly 12 is pivotally connected to the lower casing, enclosure or body 72. An upper casing, enclosure or body 73, together with the lower enclosure 72, forms a complete enclosure 17 for the power supply 23 and the control circuit 22. In the present instance, the upper enclosure 73 is held fixedly with respect to the lower enclosure 72 by a retaining cap 69. The upper enclosure 73 and the lower enclosure 72 together form the circuit enclosure 17 shown in FIG. 1.

The retaining cap 69, shown in FIG. 3, snaps onto the end of a shaft 74 generally axially centered within the solenoid valve coil 25. In the illustrated embodiment, a metal casing 75 encloses a portion of the valve coil 25.

FIG. 4 shows the relay 26, the second capacitor 61 and the transformer 59 mounted upon a circuit board 76. The reset switch 27 and the first and second probe terminals 29 and 30 are mounted upon the lower enclosures 72, as best shown in FIG. 4. The first and second probe terminals 29 and 30 are connected to the lower casing 72 by fastening means 77 comprising a screw or bolt.

Referring to FIG. 3, the reset switch 27 has a spring loaded, manually operated push button 78 that permits the reset switch 27 to be manually actuated in order to unlatch the relay 26. In a preferred construction, the other components (not shown in FIG. 3) of the power supply 23 and the control circuit 22 are mounted upon the circuit board 76.

In operation, the valve assembly 12 is connected in a water supply conduit 11 and 13 between the water supply and the appliances 14 and 15. The automatic valve apparatus 10 may be connected as close as practicable to the appliances 14 and 15. It will be appreciated that the automatic valve control apparatus 10 may be connected immediately before the washer 14 or the water heater 15.

Preferably, the automatic valve apparatus 10 is attached to the main water inlet to a house or dwelling. In such a configuration, the first conduit 11 would be the main water inlet, and the valve 12 could control the flow of water to 11 of the applicances 14 and 15 may be monitored for a flood by several probe conductors 19 and 20 connected in parallel. Although FIG. 1 illustrates the present invention in connection with two appliances 14 and 15, it is understood that it may be used to simultaneously monitor more than two flood sites by connecting several conductors 19 and 20 in parallel. Thus, one valve 12 may effectively control the water flow to a large number of appliances.

Referring to FIGS. 3 and 4, electrical means 24 connects the apparatus 10 to a source of electrical current 21. The first and second probe terminals 29 and 30 are connected to probe conductors 19 and 20, shown in FIG. 1. The probe conductors 19 and 20 are placed preferably on the floor in the area immediately adjacent or underneath the appliances 14 or 15.

As best shown in FIG. 1, the apparatus 10 is mounted so that the solenoid shaft 16 is vertical and upright, in order to reduce the possibility of foreign matter accumulating in the core area of the solenoid 25.

It will be appreciated that the apparatus 10 may be connected to an appliance 14 or 15 without modifying the appliance. The apparatus 10 lends itself to connection to existing appliances without modification or significant difficulty. The compact size of the apparatus 10 achieved in the present invention reduces the space occupied by the apparatus 10 and permits its location inconspicuously out of sight. It will be appreciated that the apparatus 10 could be incorporated within the interior of an appliance 14 or 15 during the fabrication of the appliance 14 or 15, or as a modification after fabrication.

In applications where a valve closure may go undetected for a relatively long time, the solenoid valve coil 25 may be energized for a long period of time. The solenoid valve coil 25 is preferably designed for continuous duty service, however, the solenoid valve coil 25 may become hot when it remains energized for a long time. Therefore, in such applications, the solenoid valve 12 and the valve coil 25 may be constructed separately from the circuit enclosure 17.

Figure 5:
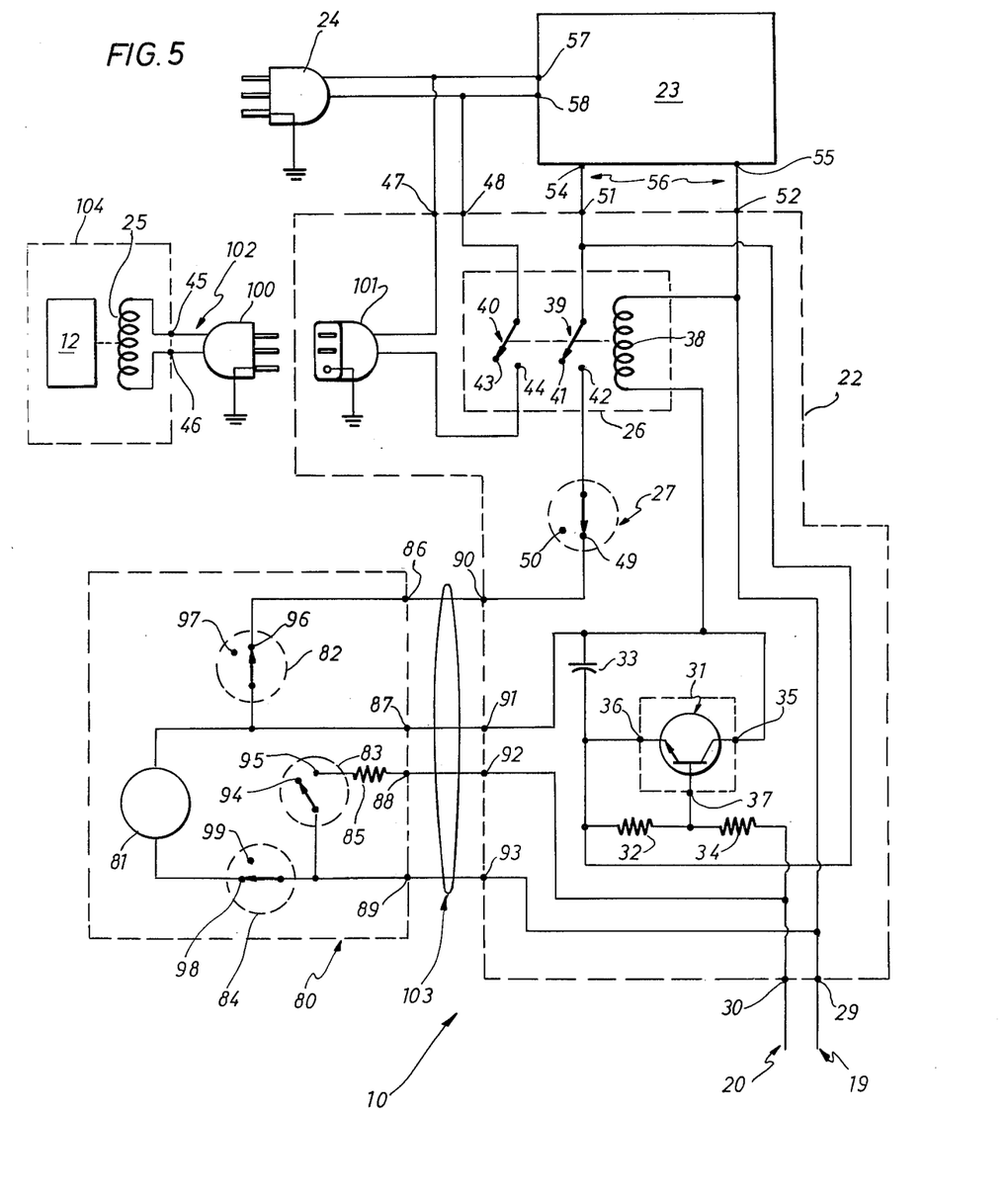
FIG. 5 is a schematic of a circuit employed in the flood control apparatus which includes a remote test circuit.

As shown in FIG. 5, the valve 12 and the solenoid valve coil 25 may be constructed in a separate valve assembly 104. In the illustrated embodiment, the second contact switch 40 of the relay 26 may have its closed position 44 connected to a female connector or socket 101. The female connector or socket 101 may also be connected to the first input terminal 47.

The female socket 101 provides a receptacle for a corresponding male connector or plug 100. A first cable or cord 102 connects the male plug 100 to the first and second ends 45 and 46 of the solenoid valve coil 25. The first cord 102 may be any convenient length. Thus, the male plug 100 is adapted to electrically connect with the female socket 101 to provide an electrical connection between the first input terminal 47 and the first end 45 of the solenoid valve coil 25. Similarly, the male plug 100 and the female socket 101 provide an electrical connection between the closed position 44 of the second contact switch 40 and the second end 46 of the solenoid valve coil 25. A third conductor may provide a ground connection between the valve assembly 104 and the control circuit 22.

This embodiment of the invention will minimize heating of the electronic components of the control circuit 22 by the valve coil 25 during extended periods of energization. Moreover, because the first cord 102 may be of any convenient length, the valve 12 may be remotely located from the remainder of the apparatus 10. The valve 12 may be located at the main water inlet of a home or dwelling and the control circuit 22 may be located at any other convenient location as desired.

Referring to FIG. 5, the apparatus 10 may include a remote test circuit 80. The remote test circuit 80 comprises a test switch 83, a test-reset switch 82, an alarm disable switch 84, a fifth resistor 85 and an alarm 81.

The first probe terminal 29 is connected to an 8th cable terminal 93. The second probe terminal 30 is connected to a 7th cable terminal 92. As best shown in FIG. 5, the load terminal 35 of switching means 31 and the first capacitor 33 are connected to a 6th cable terminal 91. The reset switch 27 is connected to a 5th cable terminal 90.

A second cable 103 connects the remote test circuit 80 to the control circuit 22.

The 5th resistor 85 has one end connected to a 3rd cable terminal 88. The test switch 83 has an open position 94 and a closed position 95. The other end of the 5th resistor 85 is connected to the test switch 83 at the closed position terminal 95. A 4th cable terminal 89 is connected to the test switch 83 and the alarm disable switch 84. Thus, the test switch 83 is placed in parallel across the first and second probe terminals 29 and 30. The test switch 83 is ordinarily maintained in the open position 94.

The apparatus 10 may be tested by closing the test switch 83 to complete the circuit between the first and second probe terminals 29 and 30 and thus cause switching means 31 to close the relay 26. The test switch 83 provides a convenient means for manually testing the operation of the flood control apparatus 10.

A test reset switch 82 has one end connected to a second cable terminal 87. The test-reset switch 82 has an open position 97 and a closed position 96. The closed position terminal 96 of the test-reset switch 82 is connected to a first cable terminal 86. When the operation of the control circuit 22 is tested by closing the test switch 83, the relay 26 and the valve 12 may be reset by momentarily opening the test reset switch 82. That is, the flood control apparatus 10 may be reset by switching the test-reset switch 82 from the closed position 96 to the open position 97.

It is sometimes desirable to have a remotely located alarm that will give an audible warning when the control circuit 22 operates to close the valve 12. In the present instance, this is essentially accomplished by the alarm 81 and the alarm disable switch 84.

The alarm disable switch 84 has an open position 99 and a closed position 98. The closed position terminal 98 of the alarm disable switch 84 is connected to one end of an alarm 81. The other end of the alarm 81 is connected to the second cable terminal 87. When the alarm disable switch 84 is in the closed or enabling position 98, the alarm 81 will sound whenever switching means 31 generates a fluid indication signal in response to a switching signal. The alarm 81 may be disabled by switching the alarm disable switch 84 to the open position 99.

The remote test circuit 80 may be located in any convenient location. The secod cable 103 may be any convenient length, thus permitting the remote test circuit 80 to be located some distance from the control circuit 22. The control circuit 22 may be located adjacent the sites to be monitored for a flood, and the remote test circuit 80 may be placed in any location where the apparatus 10 may be conveniently tested. The remote test circuit 80 may provide an audible alarm at a location removed a significant distance from the appliances 14 and 15 or other sites to be monitored.

In practice, a low current drawing sounder such as a piezoelectric sounder has given satisfactory results for the alarm 81. The 5th resistor 85 simulates the relatively high resistance of water to provide a more effective test of the operation of the control circuit 22. The 5th resistor 85 may be any value that approximates the resistance of the water sought to be detected by the fluid probe 18.

In practice, a push button, momentary contact, normally open switch has given satisfactory results for the test switch 83. In practice, a push button, momentary contact, normally closed switch has given satisfactory results for the test-reset switch 82. The alarm disable switch 84 may be a single pole/single throw toggle switch.

Preferably, the 5th, 6th, 7th and 8th cable terminals 90, 91, 92 and 93 may be placed upon a four connector terminal strip with screw-type connectors. If the remote test circuit 80 is removed or not used, a jumper wire or a conductor may be connected between the 5th cable terminal 90 and the 6th cable terminal 91 to restore the latching operation of the second contact switch 39.

Similarly, the first cable terminal, second cable terminal, third cable terminal and fourth cable terminal 86, 87, 88 and 89 may be placed upon a four-connector screw-type terminal strip.

SUMMARY OF ADVANTAGES OF THE INVENTION

It will be appreciated that in constructing an automatic flood control valve apparatus according to the present invention, certain significant advantages are provided.

In particular, an automatic flood control valve is provided which does not require significant electrical current or energy during normal operation; the valve only draws significant electrical power in the event of a flood. The valve is normally open and does not require electrical energy to hold it in an open position.

In addition, an automatic flood control apparatus is provided which does not require complicated or delicate probes, capacitors or difficult to adjust floats, in order to detect a flood. An automatic flood control apparatus constructed according to the present invention requires only simple conductors for the detection of flooding water. The conductor may be arranged in any convenient location or configuration to provide the flexibility of conveniently tailoring their placement for any particular location of the appliance. Moving parts for the detection of water, such as floats, are not required. The invention does not employ collecting trays or other bulky components.

A related advantage provided by the present invention is the sensitivity of the apparatus. The apparatus does not require that a large amount of water be provided to yield a path between the probe terminals of sufficient conductivity to pass relatively large amounts of current. Instead, the present invention requires only a small current to momentarily flow between the probe terminals in order to actuate the valve. Thus, the sensitivity and reaction time are improved. Moreover, current need not continue to flow between the probe terminals, because the present invention includes the advantage of a latching relay.

The advantage of the latching relay provided by the present invention holds the valve closed once a flood has been detected. Thus, even if water evaporates, is removed or cleaned up, or the flooding condition is not noticed for a long period of time, the automatic flood control apparatus will hold the valve in a closed position until it is manually reset. The valve will not normally restore the flow of water to a damaged appliance until it is reset.

The present invention provides the advantage of being adaptable to monitor a great number of potential flood sites and control the water flow with a single valve. Fluid probes may be connected in parallel to monitor several appliances at once. A single valve may be connected to the main water inlet to simultaneously shut off the flow of water to all appliances in the event of a flood. The present invention has the advantage of not requiring a separate valve for each appliance, as has been common in the prior art.

The present invention includes the advantage of permitting remote testing of the operation of the circuit, or remote resetting of the valve. The advantage of a remote audible alarm is also provided.

An automatic flood control apparatus constructed according to the present invention permits the apparatus to be constructed simply and inexpensively. The small and compact size of the apparatus permits it to be conveniently located and, if desired, it can be located within the housing or enclosure of the appliance. However, the present invention has the advantage of allowing installation external to the appliance. Thus no modification of the appliance is necessary, and installation may be accomplished by an average home owner.

The vibration resistance of the preferred relay and valve coil permit the apparatus to withstand mechanical vibration and shock without significantly affecting the performance of the apparatus. The circuit is simple, rugged and reliable. Only one transistor is required for the sensor circuit, with the resultant economical advantages of construction. The invention does not require adjustment. In addition, the invention has the advantage of being automatic.

Finally, a significant advantage is achieved by the ability of the apparatus to operate with considerable variations in the preferred component values without significant deterioration of performance. Component values are not critical. Thus, deterioration or aging of the sensor circuit transistor will not affect the performance of the apparatus. Of independent significance, the apparatus offers the advantage of providing an automatic fluid control apparatus that does not require delicate adjustment or careful protection from mechanical vibration and moisture condensation in order to function properly.

Further modifications and alternative embodiments of the apparatus of this invention will be apparent to those skilled in the art in veiw of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. Equivalent elements or materials may be substituted for those illustrated and described herein. For example, a battery or equivalent power supply may be substituted for the power supply disclosed. In addition, parts may be reversed, and certain features of the invention may be utilized independently of the use of other features, all as would be apparent to one skilled in the art after having the benefit of this description of the invention.

What is claimed is:

1. A flood control apparatus for sensing a flood and for discontinuing the flow of fluid to an appliance in response to a flood, comprising in combination:

a fluid probe, said probe having a first probe terminal and a second probe terminal, said probe being adapted to respond to the presence of fluid by permitting the flow of electrical current between said first and second probe terminals;

switching means, said switching means having a sensor terminal, a load terminal, and a common terminal, said sensor terminal being connected to said second probe terminal, said switching means being adapted to generate a flood indication signal between said load terminal and said common terminal in response to a switching signal between said sensor terminal and said common terminal;

power supply connection means, said connection means having a first power supply terminal and a second power supply terminal, said first power supply terminal being connected to said common terminal of said switching means, said second power supply terminal being connected to said first probe terminal, said connection means being adapted to permit the connection of a source of electrical current between said first power supply terminal and said second power supply terminal to facilitate electrical energization of the flood control apparatus;

a solenoid valve coil, in combination with a normally open valve adapted to control the flow of fluid to an appliance, said valve coil having a first end connected to a first input terminal, said valve coil having a second end, and said valve coil being adapted to close said valve in response to the flow of electrical current through said valve coil;

a relay, said relay having a first contact switch and a second contact switch, said first and second contact switches having an open position and a closed position, said relay having a closing coil for switching said first and second contact switches between said open and closed positions, said second contact switch being interposed between the second end of said valve coil and a second input terminal, said second contact switch being normally in the open position when no electrical current flows through said closing coil, said first and second input terminals being adapted to permit the connection of an electrical current source, said second contact switch being adapted to permit the flow of electrical current through said valve coil in response to the flow of electrical current through said closing coil, said closing coil having a first end connected to said second power supply terminal and having a second end connected to said load terminal of said switching means, said closing coil being adapted to close said first and second contact switches in response to the flow of electrical current through said closing coil;

said probe, said switching means, and said first resistor being mutually cooperable to produce a flood indication signal between said load terminal and said common terminal of said switching means in response to the flow of electrical current between said first and second probe terminals;

said switching means, said closing coil, said relay, and said valve coil being mutually cooperable to close said valve in response to said flood indication signal, said valve being operable to shut off the fow of fluid to the appliance; and, circuit means, said circuit means being adapted to keep said normally open valve closed by maintaining the flow of electrical current through said valve coil after said valve is closed in response to said flood indication signal, said circuit means including said first contact switch, said first contact switch being connected between said first power supply terminal and said load terminal of said switching means, said first contact switch being normally in the open position when no electrical current flows through said closing coil, said circuit means, in cooperation with said closing coil, said relay and said valve coil, being adapted to maintain said normally open valve in the closed position, after said closing coil of said relay is energized by said flood indication signal, even if said flood indication signal disappears.

2. The apparatus according to claim 1, further comprising:

a first resistor connected between said sensor terminal and said first power supply terminal, said resistor being adapted to provide a switching signal in response to the flow of electrical current through said probe.

3. The apparatus to claim 2 wherein said switching means comprised a transistor, said transistor having an emitter, a base and a collector, said emitter being connected to said common terminal, said base being connected to said sensor terminal, and said collector being connected to said load terminal, said transistor being responsive to said switching signal and operative to close said first and second contact switches of said relay by permitting electrical to flow through said closing coil of said relay.

4. The apparatus according to claim 1, further comprising:
a reset switch interposed between said closing coil of said relay and said first contact switch of said relay, said reset switch having an open position and a closed position, said reset switch being normally in the closed position, said reset switch being operable to interrupt the flow of electrical current through said closing coil of said relay when said reset switch is switched to the open position, said reset switch being operable in mutual cooperation with said relay and said valve coil to open said valve when said reset switch is switched to the open position, said circuit means being adapted to maintain said valve in the closed position after said closing coil is energized by said flood indication signal until said reset switch is switched to the open position.

5. The apparatus according to claim 3, further comprising:
a capacitor connected between said first power supply terminal and said second end of said closing coil of said relay;
a second resistor interposed between said second probe terminal and said sensor terminal of said switching means.

6. The apparatus according to claim 1, further comprising:
a power supply having a first power output terminal, a second power output terminal, a third input terminal and a fourth input terminal, said power supply having said third and fourth input terminals connected to a source of alternating electrical current, said power supply having said first power output terminal connected to said first power supply terminal and said second output terminal connected to said second power supply terminal, said power supply comprising a transformer having a primary winding and a secondary winding, said primary winding being connected between said third and fourth input terminals, said secondary being connected to the input terminals of a full-wave bridge rectifier, said bridge rectifier having a first bridge output terminal and a second bridge output terminal, said first bridge output terminal being connected to said first power output terminal, said second bridge output terminal being connected to one end of a third resistor, the other end of said third resistor being connected to said second power output terminal, a second capacitor being connected between said first and second bridge output terminals, and a fourth resistor being connected between said first and second power output terminals, said power supply being operable to supply electrical current to said probe, said switching means, said first resistor, said valve coil, said first capacitor, and said second resistor.

7. A flood control apparatus for sensing a flood and for discontinuing the flow of fluid to an appliance in response to a flood, comprising:
a fluid probe, said probe having a first probe terminal and a second probe terminal, said probe being adapted to respond to fluid by generating a fluid presence signal between said first and second probe terminals;
switching means, said switching means having a sensor terminal, a load terminal, and a common terminal, said sensor terminal being connected to said second probe terminal, said switching means being adapted to generate a flood indication signal between said load terminal and said common terminal in response to said fluid presence signal;
power supply connection means, said connection means, having a first power supply terminal and a second power supply terminal, said first power supply terminal being connected to said common terminal of said switching means, said second power supply terminal being connected to said first probe terminal, said connection means being adapted to permit the connection of a source of electrical current between said first power supply terminal and said second power supply terminal to facilitate electrical energization of the flood control apparatus;
a separate and remote test-reset switch to facilitate remote resetting of the flood control apparatus, said test-reset switch having a closed position and an open position, said test-reset switch being normally in the closed position;
a solenoid valve coil, in combination with a normally open valve adapted to control the flow of fluid to an appliance, said valve coil having a first end connected to a first input terminal, said valve coil having a second end, and said valve coil being adapted to close said valve in response to the flow of electrical current through said valve coil;
a relay, said relay having a first contact switch and a second contact switch, said first and second contact switches having an open position and a closed position, said relay having a closing coil for switching said first and second contact switches between said open and closed positions, said first contact switch being connected between said first power supply terminal and said test-reset switch, said test-reset switch being remote from said first contact switch and being connected to said first contact switch through cable means, said test-reset switch being remote from and having its other end connected to said closing coil of said relay through cable means, said first contact switch being normally in the open position, said second contact switch being interposed between the second end of said valve coil and a second input terminal, said second contact switch being normally in the open position, said first and second input terminals being adapted to permit the connection of an electrical current source, said second contact switch being adapted to close and permit the flow of electrical current through said valve coil in response to the flow of electrical current through said closing coil, said closing coil having a first end connected to said second power supply terminal and having a second end connected to said load terminal of said switching means, said closing coil being adapted to close said first and second contact switches in response to the flow of electrical current through said closing coil;
a separate and remote test switch to facilitate remote testing of the flood control apparatus, said test switch having a closed position and an open position, said test switch being normally in the open position, said test switch being connected between said first probe terminal and said second probe terminal, said test switch being connected remote from said first probe terminal and said second probe terminal through cable means;

an alarm, said alarm being connected between said load terminal of said switching means and said second power supply terminal, said alarm being adapted to generate an alarm indication in response to said flood indication signal;

said probe, said switching means, and said first resistor being mutually cooperable to produce a flood indication signal between said load terminal and said common terminal of said switching means in response to said fluid presence signal;

said switching means, said closing coil, said relay, and said valve coil being mutually cooperable to close said valve in response to said flood indication signal, said valve being operative to shut off the flow of fluid to the appliance, said first contact switch being adapted to maintain said contact switches of said relay in the closed position when said closing coil of said relay is energized by said flood indication signal between said load terminal and said common terminal of said switching means; and, said test switch and test-reset switch being cooperable through said cable means to permit remote testing and remote resetting of the apparatus.

8. The apparatus according to claim 7, further comprising:

a reset switch interposed between said test-reset switch and said first contact switch of said relay, said reset switch having an open position and a closed position, said reset switch being normally in the closed position, said reset switch being operable to interrupt the flow of electrical current through said closing coil of said relay when said reset switch is switched to the open position, said reset switch being operable in mutual cooperation with said relay and said valve coil to open said valve when said reset switch is switched to the open position.

9. The apparatus according to claim 7 or claim 8, further comprising:

circuit means, said circuit means being adapted to keep said normally open valve closed by maintaining the flow of electrical current through said valve coil after said valve is closed in response to said flood indication signal, said circuit means including said first contact switch, said first contact switch being connected between said first power supply terminal and said load terminal of said switching means, said first contact switch being normally in the open position when no electrical current flows through said closing coil, said circuit means, in cooperation with said closing coil, said relay and said valve coil, being adapted to maintain said normally open valve in the closed position, after said closing coil of said relay is energized by said flood indication signal, even if said flood indication signal disappears.

* * * * *

UNITED STATES PATENT AND TRADEMARK OFFICE
CERTIFICATE OF CORRECTION

PATENT NO. : 4,324,268
DATED : April 13, 1982
INVENTOR(S) : Avram A. Jacobson

It is certified that error appears in the above-identified patent and that said Letters Patent are hereby corrected as shown below:

Column 7, line 64, "thwe" should be --the--;
Column 14, line 33, "fow" should be --flow--;
Column 14, line 52, after "1," insert --or 7--;
Column 14, line 59, after "apparatus" insert --according--;
Column 14, line 67, after "electrical" insert --current--.

Signed and Sealed this

Sixth Day of July 1982

[SEAL]

Attest:

GERALD J. MOSSINGHOFF

Attesting Officer

Commissioner of Patents and Trademarks